(No Model.)
C. H. BAYLEY.
SKIVING MACHINE.
No. 518,774. Patented Apr. 24, 1894.
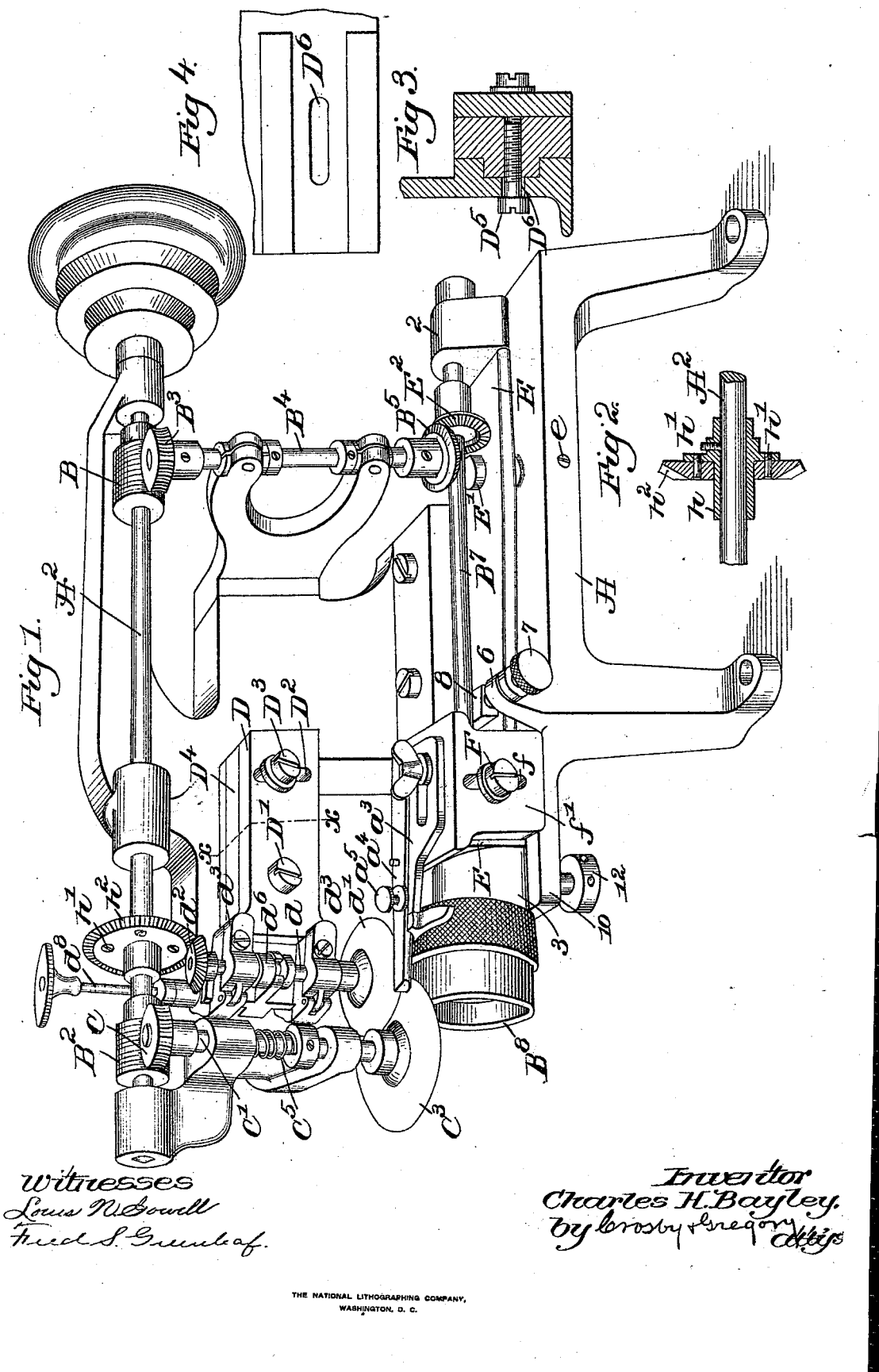
Witnesses
Louis N. Dowell
Fred S. Greenleaf
Inventor
Charles H. Bayley.
by Crosby & Gregory
Attys

UNITED STATES PATENT OFFICE.

CHARLES H. BAYLEY, OF BOSTON, MASSACHUSETTS.

SKIVING-MACHINE.

SPECIFICATION forming part of Letters Patent No. 518,774, dated April 24, 1894.

Application filed November 4, 1893. Serial No. 489,976. (No model.)

*To all whom it may concern:*

Be it known that I, CHARLES H. BAYLEY, of Boston, county of Suffolk, State of Massachusetts, have invented an Improvement in Skiving-Machines, of which the following description, in connection with the accompanying drawings, is a specification, like letters and figures on the drawings representing like parts.

This invention has for its object to improve the class of machines represented in United States Patent No. 479,583, granted to me July 26, 1892. In the machines of this class where the cutter is made adjustable toward and from the work-supporting or feed wheel, it is necessary for proper running of the machine, that the angular position of the cutter shaft axis with relation to the axis of its main driving shaft should remain always substantially constant, in order that the connecting gears might mesh properly in whatever adjusted position the cutter might be. This was accomplished in said patent by journaling the cutter shaft in a frame made adjustable about a pivotal axis substantially coincident with the axis of its main driving shaft, so that the connecting gears always properly mesh, whatever be the extent of movement of the cutter about its pivot. In the machine shown in the patent referred to, however, the plane or angular position of the cutter with relation to the work supporting or feeding wheel and work thereon, varies in different adjusted positions. To obviate this in the machine to be herein described, I have constructed the machine in such a manner as to permit the relative position of the cutter and supporting or feeding wheel to be varied to bring the cutter nearer to or farther from said wheel, without changing the plane or angular position of the cutter and without changing the position of the axis of the cutter shaft with relation to its main shaft.

The machine is preferably constructed with the shaft of its supporting or feeding wheel mounted in a frame or yoke so pivoted that it may be turned to move the said wheel toward and from the disk cutter and in the plane of the said cutter, without disturbing the mesh of the gear on the shaft of the supporting wheel with its driving gear.

In the machine to be herein described, I have also mounted the cutter shaft in bearings, the carrier for which is adjustable longitudinally with relation to the axis of the shaft of the work supporting wheel, in order that the said cutter shaft and its cutter may be moved longitudinally with relation to the work supporting wheel to bring the axis of said cutter into proper position with relation to the center line of the scarfs, which center line varies with the varying depths of scarfs. I have also further improved the said machine by providing the main shaft with a nonmetallic toothed gear to engage the gear on the cutter shaft.

Figure 1, of the drawings, in perspective, shows my present invention applied to a machine of the class described. Fig. 2 shows the wheel $h^2$ in section; Fig. 3, a sectional detail taken on the line $x-x$ Fig. 1, showing the manner of mounting the adjustable cutter shaft carrier, and Fig. 4, a detail looking at the face of the frame, the same showing the groove therein and the slot for the clamping screw to be described.

The frame-work A has suitable bearings for a shaft $A^2$ provided with a worm B and a worm $B^2$. The worm $B^2$ engages a worm gear C fast on a shaft $C'$ provided at its lower end with a disk-like presser-foot $C^3$, said shaft being surrounded by a suitable spring $C^5$ which controls the effective pressure of said pressing disk upon the material resting upon the supporting or feeding wheel $B^8$, to be described.

$d'$ represents a disk cutter fast upon a cutter shaft $d$ provided at its upper end with a bevel gear $d^2$, said shaft being mounted in suitable bearings $d^3$, a grooved collar $d^6$ fast on the shaft being entered by a forked block on a screw shaft $d^8$, the rotation of which enables the cutter shaft to be moved longitudinally, as desired.

The parts so far described and designated by letters are common to those described and designated by like letters in United States Patent No. 479,583.

The bearings $d^3$ for the cutter shaft form part of a block D pivoted upon a stud screw $D'$ carried by the horizontally adjustable carrier $D^4$, said block being made adjustable upon the said carrier by or through a slot $D^2$ in said block and a screw $D^3$ on the carrier and entering said slot. The carrier $D^4$ is tongued at its rear side to enter and slide in a suitable groove in the frame of the machine, as best shown in Fig. 3, the said carrier being provided with a rearwardly extended clamping screw $D^5$ arranged in a slot $D^6$ in the frame, which slot permits the said carrier with its cutter shaft-carrying block D to be adjusted horizontally or longitudinally of the work supporting wheel, the said carrier being retained in adjusted position by means of the clamping screw $D^5$.

The worm B engages a worm gear $B^3$ fast on an upright shaft $B^4$ having at its lower end a bevel gear $B^5$, said shaft and gears being as also common to said patented machine.

In this present embodiment of my invention the supporting or feeding wheel $B^8$ is mounted upon a rotary shaft $B^7$, as in said patent, but herein, instead of said shaft having bearings fixed to the frame, it has bearings 2, 3, shown as carried by a yoke E pivoted upon a stud $E'$ secured to the frame in any suitable manner, as by a set screw $e$, the longitudinal center of said stud being substantially coincident with the longitudinal center of the shaft $B^4$, so that as said yoke is turned, as it may be when required, about the said stud, the bevel gear $E^2$ fixed to said shaft may always remain properly in mesh with the teeth of the bevel gear $B^5$ on the shaft $B^4$, said shaft acting as the source of motion for the shaft $B^7$.

The frame E has adjustably connected with it by a screw F in slot $f$, a stand $f'$, upon which is adjustably mounted a gage $a^3$ carrying a spring $a^4$ made adjustable as to its effective pressure by an adjusting screw $a^5$. This gage, spring and adjusting screw are common to the patent referred to, but therein the stand carrying them was adjustable on the frame of the machine, whereas in this invention the said stand is carried by the yoke so as to partake of its movements, so that the said gage and spring may follow the supporting or feeding wheel in its adjustment.

The frame-work of the machine has an ear 6 in which is an adjusting screw 7 having collars or shoulders at each side said ear, so that the said screw may be rotated and yet not be moved longitudinally in the ear, the threaded inner end of said screw entering a threaded hole in a nut or projection 8 secured to the yoke frame E.

The frame-work, or an extension 10 thereof, has a slot through which is passed a clamp screw 12 which enters the bearing 3 of the yoke E, a shoulder acting against the frame to bend said yoke in its adjusted position. When this clamping screw is loose, the adjusting screw 7 may be rotated in one or the other direction and move the supporting or feeding wheel $B^8$ toward or from the edge of the disk cutter $d'$ or the longitudinal center of the shaft $d$, to thus compensate for any wear of the disk cutter by reason of grinding, or for any other purpose, when adjustment of the space between the edge of the cutter and the said wheel is desired. To avoid the chattering noise due to the meshing of bevel gears, I have in this instance of my invention provided the shaft $A^2$ with a bevel gear made up of a hub $h$, to a projecting portion of which by suitable screws $h'$ I have attached a non-metallic bevel toothed plate $h^2$, said toothed bevel plate engaging the teeth of the bevel gear $d^2$. I find such a gear substantially noiseless, and it adds very materially to the desirability as well as to the utility of the machine.

By mounting the cutter shaft carrying block D upon an adjustable carrier, thereby making the said block adjustable longitudinally with relation to the work-supporting wheel, I am enabled to so change the position of the axis of the cutter as to bring the said axis always into proper position with relation to the center line of the skiving or piece of leather to be removed, that is, the position of said axis will for the best results, necessarily be located in a more forward position for narrow than for wider scarfs.

Believing myself to be the first to provide suitable mechanism by which the relative positions of the cutter and feeding or supporting wheel may be varied to position the cutter nearer to or farther from the said feeding or supporting wheel, without changing the plane of the cutter or the angle of the cutter shaft axis with relation to the axis of its main driving shaft, this invention is not limited to the particular construction herein shown for accomplishing this result, for the same obviously may be varied without departing from the spirit and scope of the invention.

Having described my invention, what I claim as new, and desire to secure by Letters Patent, is—

1. In a skiving machine, the combination with a cutter to skive the material, of a rotating work-supporting or feeding wheel, its shaft, and a yoke or frame therefor, and adjusting devices to adjust said yoke or frame toward and from said cutter and in a plane parallel with the plane of said cutter, substantially as described.

2. In a skiving machine, the following instrumentalities, viz:—a skiving cutter, a disk-like presser or clamp, means to rotate it, a work-supporting and feeding wheel, a movable yoke or frame supporting said wheel, and devices to effect the adjustment of said wheel toward and from and in a plane parallel with the plane of said cutter, for the purposes set forth.

3. In a skiving machine, the following instrumentalities, viz:—a skiving cutter, a disk-like presser or clamp, means to rotate it, a work-supporting and feeding wheel, a movable yoke or frame supporting said wheel, devices to effect the adjustment of said wheel toward and from said cutter, and a guide and spring to co-operate with the edge of the material resting on said wheel and under said spring, said guide and spring following the wheel in its adjustments, substantially as described.

4. In a skiving machine, the main shaft; the cutter shaft, connecting gearing between them; a disk cutter; a work-supporting and feeding wheel; its shaft, a pivoted yoke for said shaft, a gear on the shaft carrying the work-supporting and feeding wheel, and a shaft, as $B^4$, and gears between it and the main shaft and between it and the shaft carrying the said work-supporting and feeding wheel, the pivotal point of the yoke or frame in which the shaft carrying the work-supporting or feeding wheel is mounted being substantially coincident with the longitudinal center of the said shaft $B^4$, to operate, substantially as described.

5. In a skiving machine, a cutter shaft, a disk cutter mounted thereon, a shaft $B^4$, means to rotate it and the said cutter shaft, a gear on said shaft $B^4$, a yoke or frame having its pivotal point substantially coincident with the center of rotation of said shaft $B^4$, a shaft as $B^7$ mounted in said yoke or frame and provided with a gear, as $E^2$, and with a work-supporting or feeding wheel; devices to adjust said yoke or frame about said pivot; and a stand, and a gage thereon, said stand being connected to and movable with said frame or yoke, to operate, substantially as described.

6. In a skiving machine, the following instrumentalities, viz:—a work supporting and feeding wheel, a rotating skiving cutter, bearings for the same and a carrier for the said cutter and its bearings, said carrier being adjustable longitudinally with relation to said work-supporting and feeding wheel, substantially as described.

7. In a skiving machine, the following instrumentalities, viz:—a frame; a work-supporting and feeding wheel; a carrier mounted in said frame and adjustable longitudinally with relation to said work-supporting and feeding wheel; a block pivoted to said carrier; bearings thereon, a cutter, and its shaft journaled in said bearings, substantially as described.

8. In a skiving machine the following instrumentalities, viz:—a rotating work-supporting or feeding wheel, its shaft, a rotating cutter to skive the material, its shaft, an actuating shaft connected with and to rotate said cutter shaft, bearings for the said cutter and actuating shafts to maintain the same always in fixed relative position, and means to vary the relative position of the said cutter and work-supporting or feeding wheel, whereby the said cutter is caused to stand in a position nearer to or farther from said wheel without changing the plane of said cutter, substantially as described.

In testimony whereof I have signed my name to this specification in the presence of two subscribing witnesses.

CHARLES H. BAYLEY.

Witnesses:
FREDERICK L. EMERY,
EMMA J. BENNETT.